(12) United States Patent
Ukai

(10) Patent No.: US 6,213,701 B1
(45) Date of Patent: Apr. 10, 2001

(54) ANCHOR

(75) Inventor: Kazuhiro Ukai, Osaka (JP)

(73) Assignee: Wakai & Co., Ltd., Osaka (JP)

( * ) Notice: Subject to any disclaimer, the term of this patent is extended or adjusted under 35 U.S.C. 154(b) by 0 days.

(21) Appl. No.: 09/531,778

(22) Filed: Mar. 21, 2000

(30) Foreign Application Priority Data

Mar. 23, 1999 (JP) .................................................. 11-078227

(51) Int. Cl.⁷ .................................................... F16B 21/00
(52) U.S. Cl. ............................ 411/345; 411/340; 411/344
(58) Field of Search .................................... 411/340, 344, 411/345, 346

(56) References Cited

U.S. PATENT DOCUMENTS

| | | | |
|---|---|---|---|
| 4,294,156 | * 10/1981 | McSherry et al. | 411/345 |
| 4,439,079 | * 3/1984 | Losada | 411/345 |
| 4,650,386 | * 3/1987 | McSherry et al. | 411/345 X |

* cited by examiner

Primary Examiner—Neill Wilson
(74) Attorney, Agent, or Firm—Wenderoth, Lind & Ponack, L.L.P.

(57) ABSTRACT

An anchor makes it possible to easily fasten an object to a brittle wall. The anchor has a plate member formed with a hole for receiving a screw, a pair of legs extending from the bottom of the plate member at both sides of the screw hole, and a slide grip member slidably mounted on the legs. With a wall sandwiched between the plate member and the slide grip member, both members are prevented from turning. Thus, it is possible to fasten an object to the wall simply by threading a screw into the hole of the plate member.

3 Claims, 9 Drawing Sheets

ANCHOR

BACKGROUND OF THE INVENTION

This invention relates to an anchor used to fasten an object to a wall or ceiling of a type not accessible to the back, by means of a screw.

It is usually impossible to fasten an object to a brittle wall such as a plasterboard simply by driving a nail or screw into the wall because the nail or screw loosens. To prevent loosening of the nail or screw, it is necessary to stick a patch of reinforcing metal on the back of the wall before the wall is erected so that the nail or screw pierced through the wall is driven into the metal patch. Once the wall is erected, it is impossible to change the position of the metal patch if there is only a little space behind the wall. Thus, a nail or screw can be used at the predetermined position only.

In other conventional arrangements, as disclosed in Japanese patent publications 36-18855 and 52-154474, instead of sticking a metal patch on the back of a wall before the wall is erected, a hole is drilled in a wall that has already been erected, and an anchor is inserted into the space behind the wall. With the anchor located behind the wall, a bolt is driven through the wall and threaded into the anchor to securely fasten an object to the wall.

The anchor of the publication 36-18855 comprises a backing plate formed with a threaded hole, a tape attached to the plate, and a ring slidably mounted on the tape. In use, the plate is inserted through a starting hole formed in a wall into the space behind the wall, and the ring is slid along the tape and fitted in the starting hole. The tape is then pulled until the plate is pressed against the back of the wall. Then an operator drives a screw into the threaded hole of the plate by turning it with one hand while pulling the tape with the other hand to keep the plate pressed against the back of the wall. This work is troublesome and difficult.

When the screw has been threaded sufficiently into the threaded hole, the portion of the tape protruding from the surface of the wall is cut, and then the screw is tightened further to securely fasten an object to the wall.

The anchor of the publication 52-154474 comprises a backing plate formed with a threaded hole, a pair of resilient legs secured to the bottom of the plate to extend perpendicular to the plate, and a slide ring slidably mounted on the legs. In use, the plate is inserted through a starting hole formed in a wall into the space behind the wall by bending the legs so as to be parallel to the plate, and the ring is slid along the legs and fitted in the starting hole. The portions of the legs protruding from the surface of the wall are then cut, and a screw is threaded into the threaded hole of the backing plate with an object pressed against the surface of the wall. Since the position of the slide ring is determined by serrations formed on the legs, it can be positioned only stepwise, so that the ring cannot be securely fitted in the starting hole. This tends to cause the ring and thus the plate to turn when the screw is driven in.

In either of the above conventional arrangements, no means are provided for preventing the backing plate from turning. Thus, the backing plate tends to turn when the screw is threaded into its threaded hole.

In any of the above conventional arrangements, if there remains, even slightly, a portion of the tape or legs protruding from the surface of wall, this portion will be sandwiched between the wall surface and the object fastened when the screw is tightened, creating a clearance between the wall and the object to be fastened. Such a clearance will cause the backing plate to turn when the screw is driven in.

An object of the invention is to provide an anchor having a means for preventing its backing member located behind a wall to which an object is to be fastened from turning or getting off position when a screw is threaded into a hole formed in the backing member.

SUMMARY OF THE INVENTION

According to the present invention, there is provided an anchor used to fasten an object to a wall, the anchor comprising an elongated back support member having a top, two sides and a bottom and formed with a first hole to receive a threaded member, a pair of legs attached to the back support member at both sides of the first hole and protruding from the bottom of the back support member, and a slide grip member comprising a body formed with a hole to receive the threaded member and slidably mounted on the legs, and an opposed pair of arms protruding from the body toward the back support member and adapted to engage the two sides of the back support member when the slide grip member is moved toward the back support member along the legs, the arms being provided on opposed surfaces thereof with jaws protruding toward each other and arranged to engage the back support member when the body is moved toward the back support member along the legs, thereby preventing the slide grip member from coming off the back support member.

Other features and objects of the present invention will become apparent from the following description made with reference to the accompanying drawings, in which:

DETAILED DESCRIPTION OF THE PREFERRED EMBODIMENT

Figures 1A, 1B:
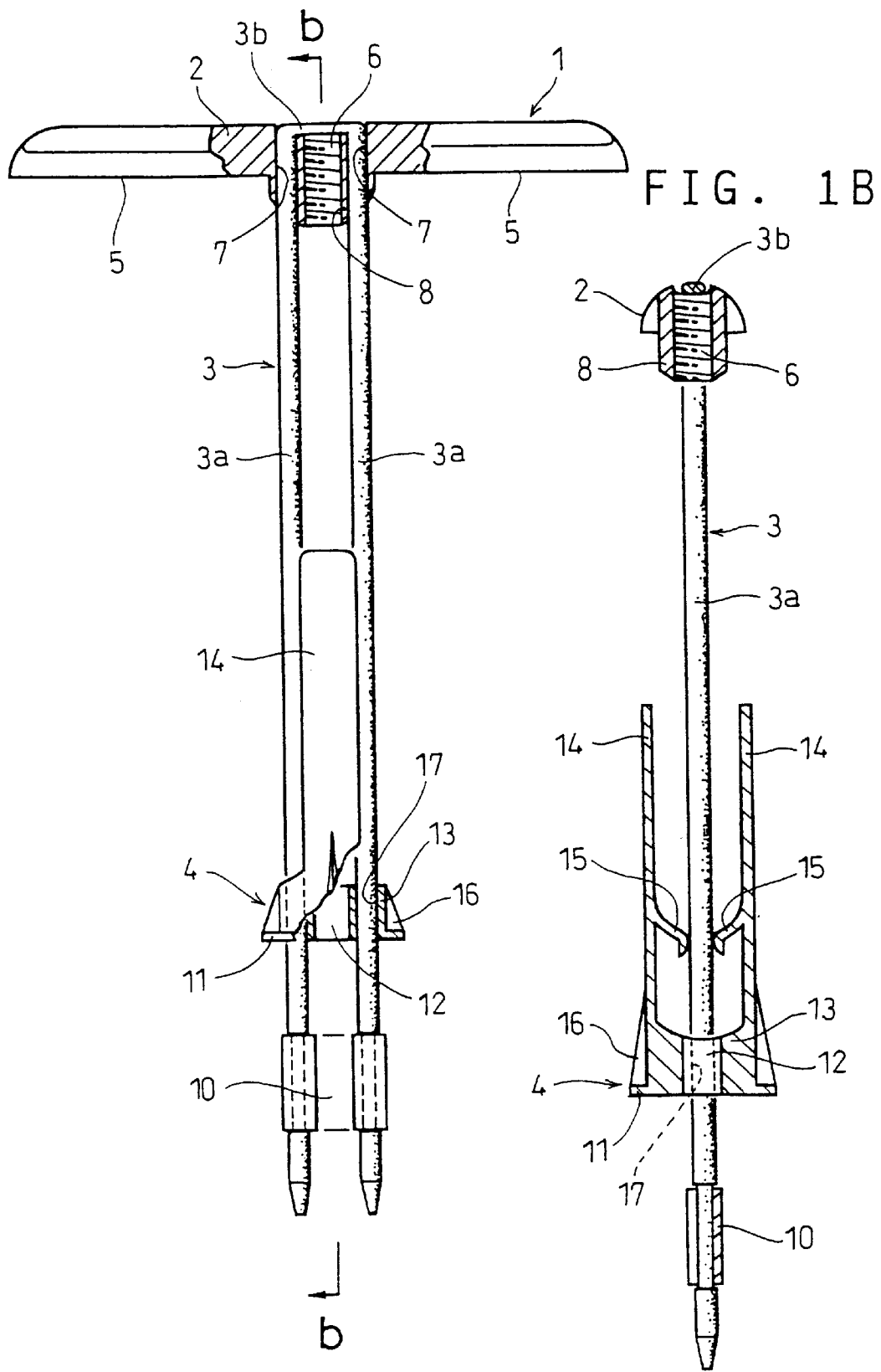
FIG. 1A is a partially cut-away front view of an anchor embodying the invention.
FIG. 1B is a sectional view along line b—b of FIG. 1A.
Figure 2:
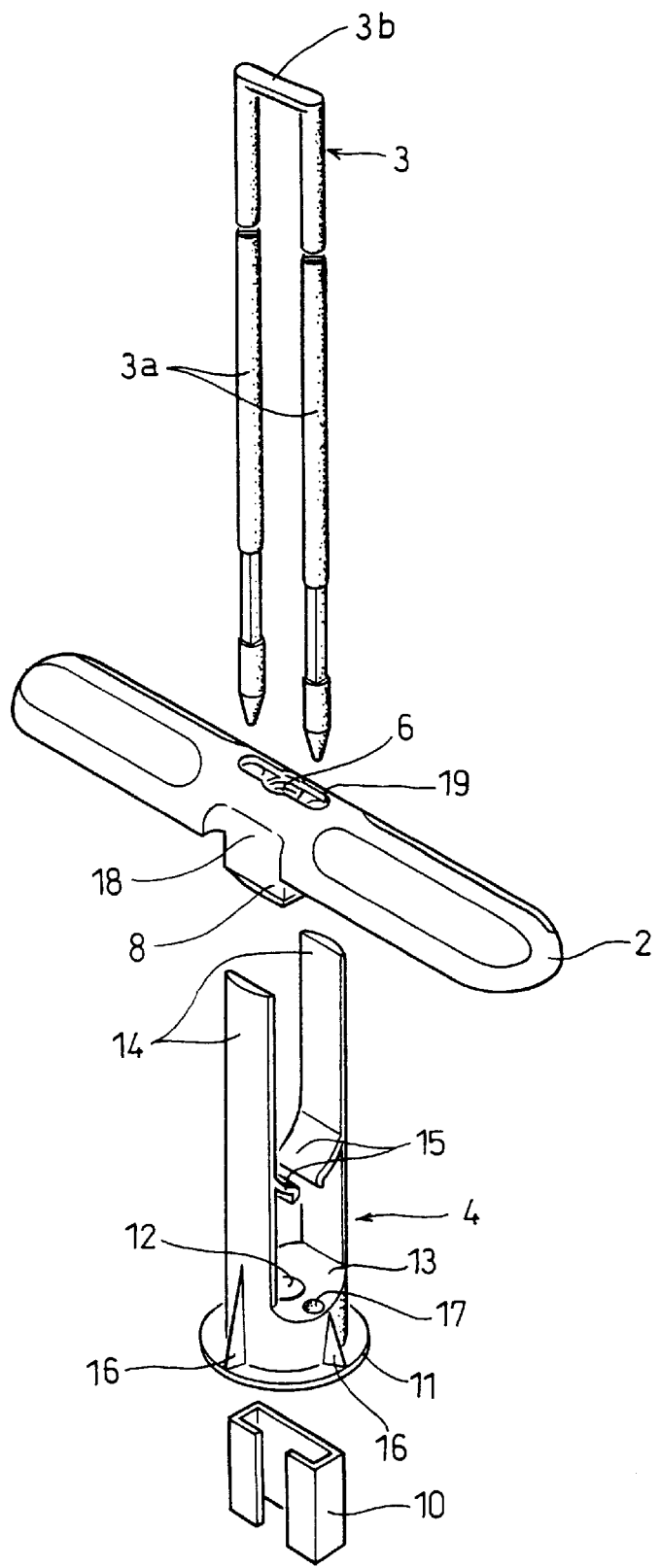
FIG. 2 is an exploded perspective view of the anchor of FIG. 1A.

First referring to FIGS. 1A–2, the anchor 1 of the invention comprises a plate member 2, a resilient leg member 3 having two legs or strings, and a slide grip member 4 slidably mounted to the leg member 3. The plate member 2 is made of a metal, a synthetic resin or any other hard material and comprises an elongated body having a flat bottom surface 5, and a cylindrical or polygonal boss 8 protruding from the flat surface 5 at its longitudinal center.

Through the body and the boss 8, the plate member 2 is formed with a hole 6 into which a threaded member such as a screw or a bolt is adapted to be inserted, and holes 7 for receiving legs 3a of the leg member 3 at both sides of the hole 6. The boss 8 increases the length of the hole 6 to more stably support a threaded member inserted in the hole 6.

Figure 9:
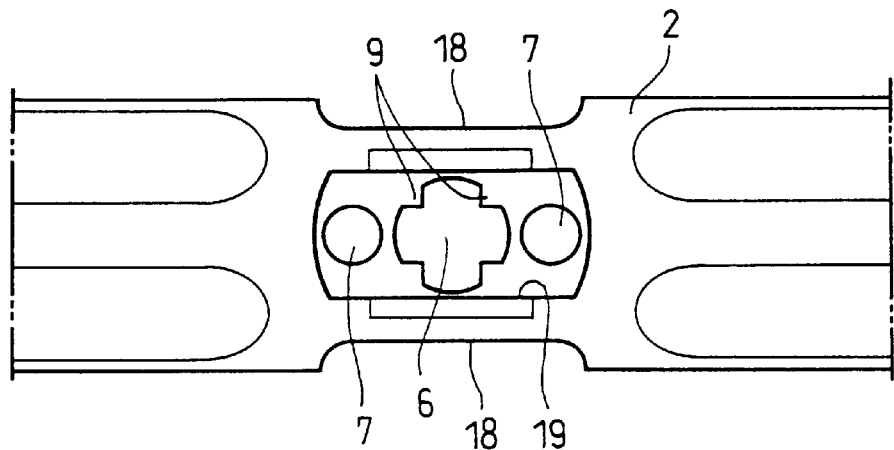
FIG. 9 is a plan view of the plate member having a modified hole for a threaded member.

The hole 6 of FIGS. 1A and 1B is a threaded hole, while the hole 6 of FIG. 9 is a hole formed with a plurality of vertical ribs 9 engageable with the threads of a threaded member driven into the hole 6.

At one end, the legs 3a of the leg member 3 are coupled together by a connecting strip 3b. In the embodiment, the legs 3a are formed by forming a resin. They are inserted through the respective holes 7. Their ends are coupled together by a coupler 10. The legs 3a may be formed by a single string which is passed through one of the holes 7 and then through the other.

The slide grip member 4 comprises a disk portion 11, a cylindrical boss 13 formed on the top surface of the disk portion 11, and a pair of diametrically opposed resilient arms 14 extending vertically from the top edge of the boss 13. The arms 14 are spaced from each other by such a distance that they can grip the body of the plate member 2 from both sides. At intermediate portions of the opposed inner surfaces of the arms 14, plate-shaped jaws 15 are provided to extend obliquely downwardly toward each other. Formed axially through the disk 11 and the boss 13 are a hole 12 through which a threaded shaft member such as a screw or a bolt is adapted to be inserted, and holes 17 through which the legs 3a of the leg member 3 can pass on both sides of the hole 12. For this purpose, the holes 17 are provided at positions angularly spaced 90° from the arms 14 and spaced from each other a distance equal to the distance between the holes 7.

Upwardly tapering, triangular wings 16 extend upwardly from the top surface of the disk 11 along the outer surface of the boss 13 and the arms 14.

The slide grip member 4 is made of a metal or a synthetic resin. The arms 14 are flat and resilient so that they can be bent toward and away from each other from the straight position. Since the holes 17 are provided at positions angularly spaced 90° from the arms 14, when the legs 3a are inserted through the holes 7 of the plate member 2 and the holes 17 of the slide grip member 4, the arms 14 are aligned in a transverse direction of the plate member 2 as will be apparent from e.g. FIGS. 1A and 1B.

Referring to FIG. 2, on both sides of the boss 8, the plate member 2 is formed with flat-bottomed recess 18 having such a width that the arms 14 are snugly receivable therein. Thus, when the slide grip member 4 is slid upwardly along the legs 3a toward the plate member 2 in the manner to be fully described hereinbelow, the arms 14 fit in the recesses 18.

When the jaws 15 come into contact with the recesses 18, the arms 14 are resiliently bent outwardly. When the jaws 15 move past the recesses 18, the arms 14 return to the straight position. Once the jaws 15 move past the recesses 18 and their tips 15a (FIG. 4a) engage a shoulder 19 formed on the top of the plate member 2, the jaws 15 prevent the slide grip member 4 from sliding downwardly relative to the plate member 2 and coming off the plate member.

Figure 4A:
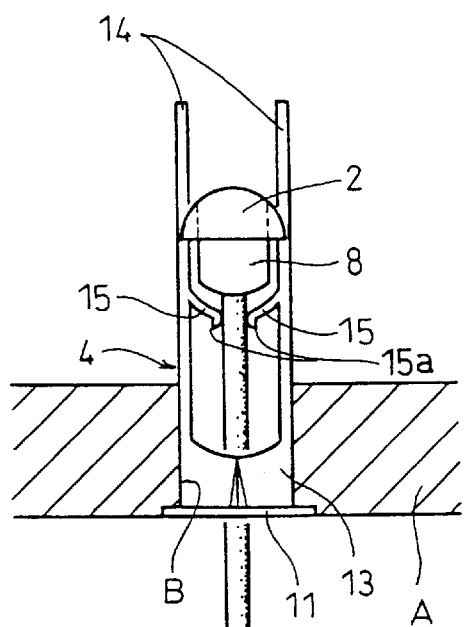
FIG. 4A is a vertical sectional view taken along line IVA—IVA of FIG. 3B.
Figure 4B:
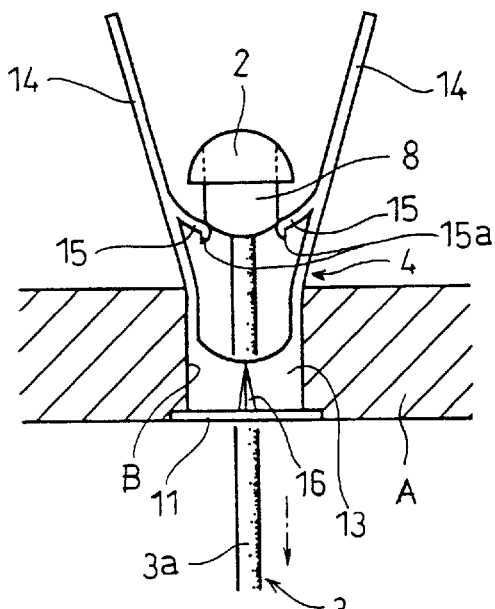
FIG. 4B is a similar sectional view of the plate member which is being pulled into between the arms of the slide member.
Figure 4C:
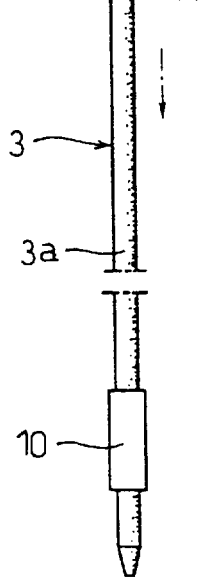
FIG. 4C is a similar view showing the plate member completely received in the slide member.
Figure 4C:
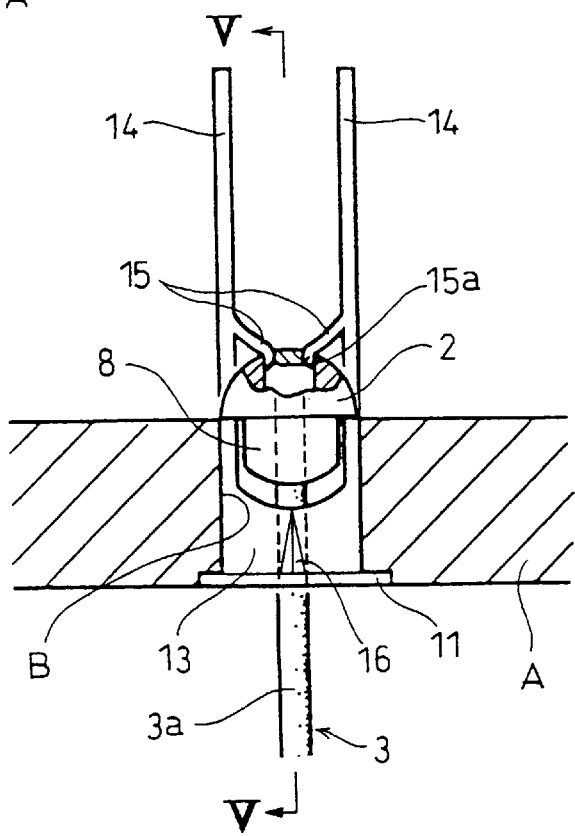

In the embodiment, as shown in FIG. 4C, the jaws 15 are provided at such a level that when the plate member 2 and the slide grip member 4 are coupled together with the jaws 15 engaged with the shoulder 19, the distance between the flat bottom surface 5 of the plate member 2 and the top of the disk portion 11 becomes substantially equal to the thickness of the wall A. But such an anchor cannot be used for a thicker wall. Thus, in order that the anchor can be used for a thicker wall, the jaws 15 may be provided at a higher level so that when the plate member 2 is coupled with the slide grip member 4, the aforementioned distance is substantially greater than the thickness of the wall A. In this arrangement, even though the plate member 2 is initially spaced from the back of the wall, as a screw D is threaded into the hole 6 of the plate member 2 (FIG. 7), the plate member is pulled toward the wall A until it is pressed against the back of the wall A.

Figure 8A:
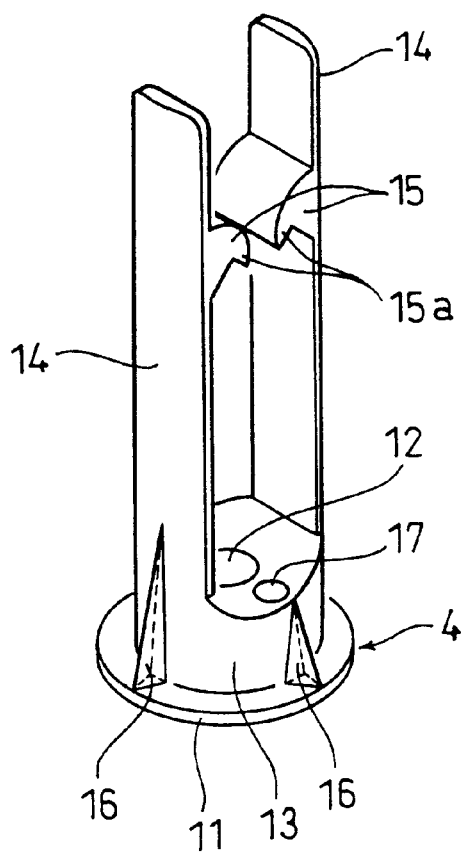
FIGS. 8A and 8B are perspective and front views of the slide member having modified jaws, respectively.
Figure 8B:
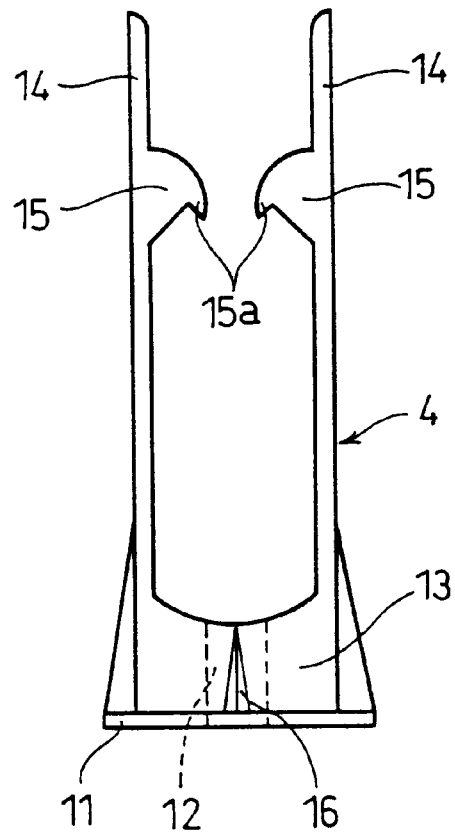

FIGS. 8A and 8B shows a variation of the jaws 15 which have a thick base portion to increase resistance to pulling forces.

Figure 10:
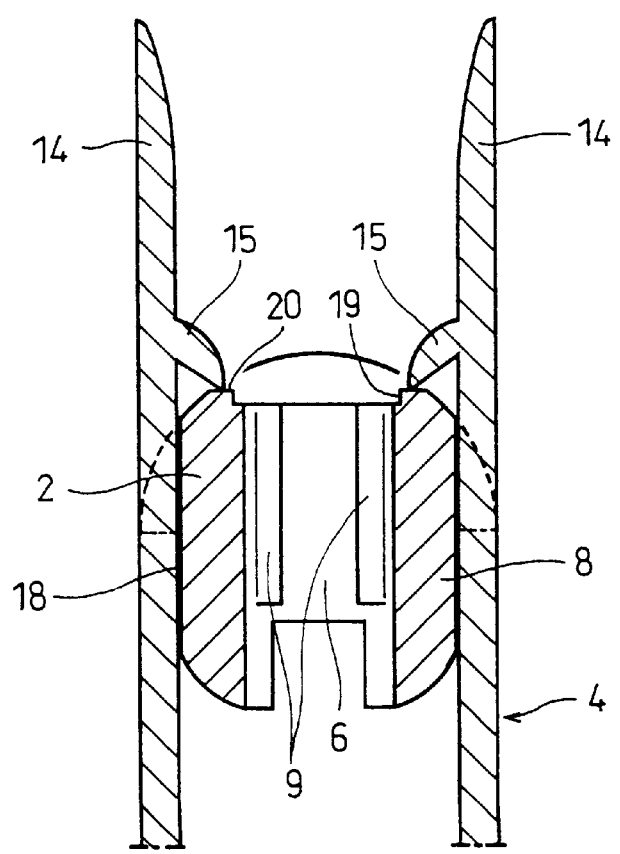
FIG. 10 is a plan view of a further embodiment of the slide member.

In the modified embodiment of FIG. 10, flat surfaces 20 are formed around the shoulder 19 so that the jaws 15 engage the flat surfaces 20 instead of the shoulder 19. Since the surfaces 20 are provided nearer to the recesses 18, it is possible to use shorter jaws 15. This in turn makes it possible to form the arms 14 and thus the entire slide grip member 4 from a less resilient material such as a metal because the arms 14 are not bent so markedly when the jaws 15 move along the recesses 18.

How to use the anchor of the invention is now described with reference to FIGS. 3A–4C.

Figure 3A:
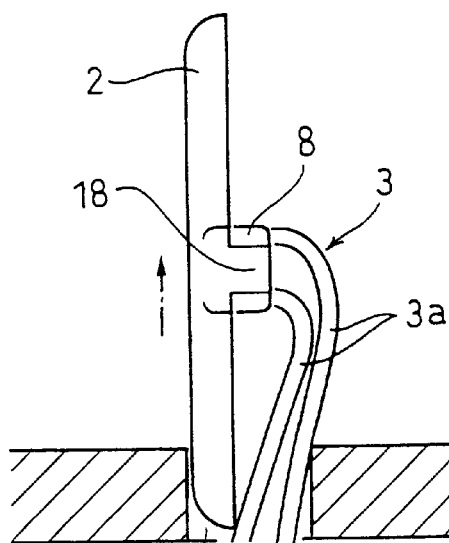
FIG. 3A is a cross-section of the anchor of FIG. 1 showing how the plate member is inserted into a starting hole formed in a wall.
Figure 3B:
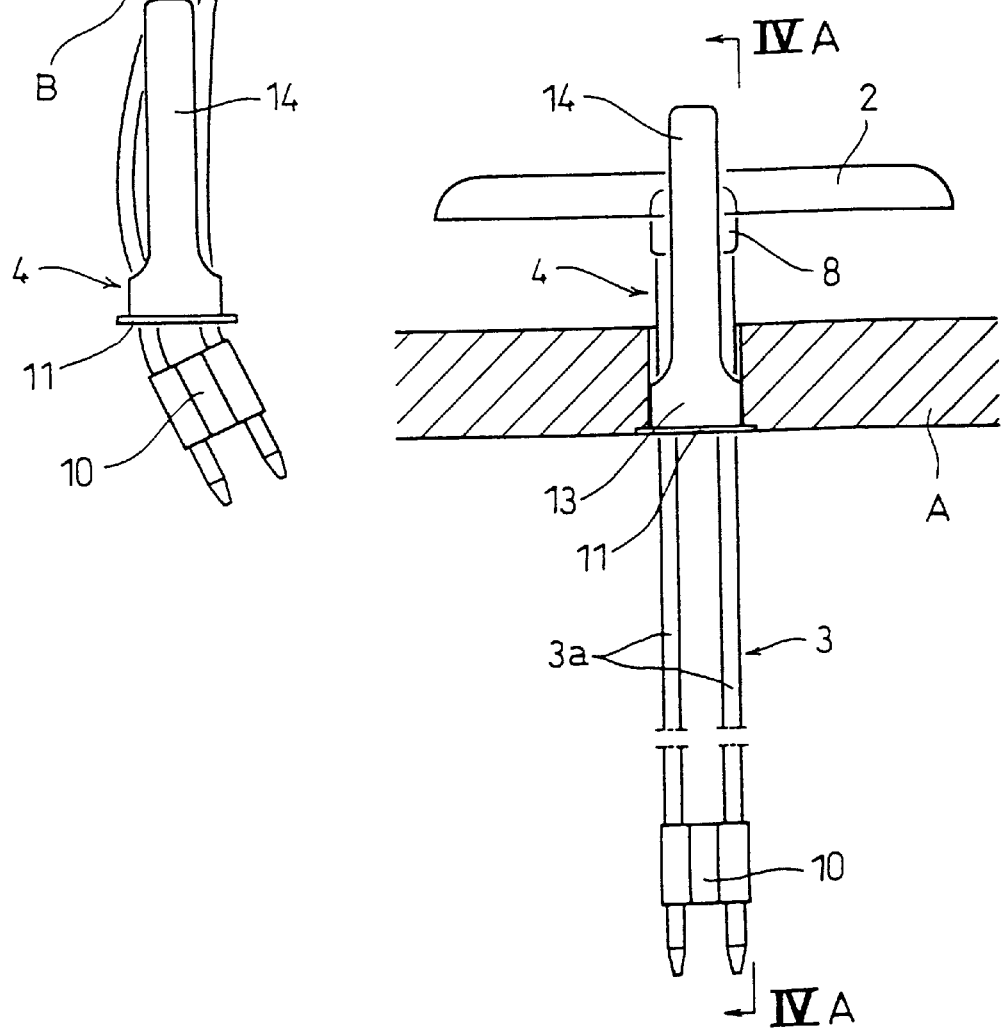
FIG. 3B is a similar view showing how the plate member is pulled toward the back of the wall until received between the arms of the slide member.

First, a starting hole B into which the arms 14 can be inserted and which is slightly smaller in diameter than the disk portion 11 is drilled in the wall A (FIG. 3A). Then, the disk member 2 is inserted into the hole B together with the legs 3a by bending the legs 3a into a direction substantially parallel to the plate member 2 as shown in FIG. 3A. When the plate member 2 gets out of the hole B, the legs 3a straighten by their own resilience to support the plate member 2 parallel to the wall A as shown in FIG. 3B. In this state, the slide grip member 4 is pushed up along the legs 3a until the disk 11 abuts the surface of the wall with the arms 14 protruding from the back of the wall as shown in FIGS. 3B and 4A.

Figure 5:
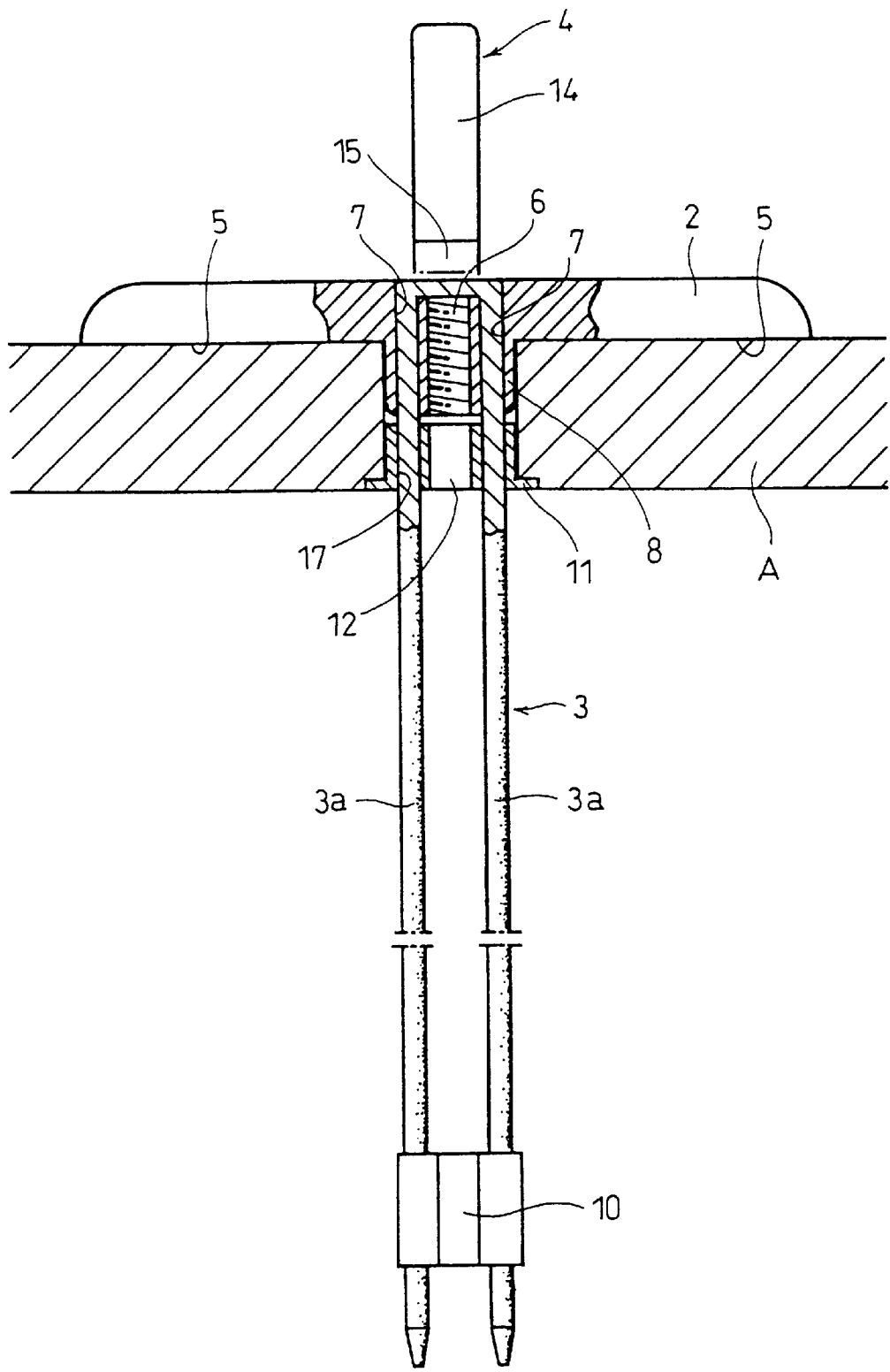
FIG. 5 is a sectional view taken along line V—V of FIG. 4C.

When the legs 3a are pulled down in this state, the jaws 15 ride onto the bottoms of the recesses 18, so that the arms 14 are bent outwardly or open as shown in FIG. 4B. As the legs 3a are pulled further down, the jaws 15 will move past the recesses 18, and the arms 14 close or straighten again until the jaws 15 engage the shoulder 19 as shown in FIGS. 4C and 5.

In this state, the wall A is sandwiched between the plate member 2 and the slide grip member 4 from both sides with the flat bottom surface 5 of the plate member abutting the back of the wall and the boss 8 inserted in the hole B.

In this state, the wings 16 formed around the boss 13 and the arms 14 bite into the wall surface of the hole B of the wall to prevent the slide grip member 4 from turning in the hole B. Since the plate member 2 is held by the arms 14 of the slide member 4, it cannot turn in the hole B either.

Figure 6:
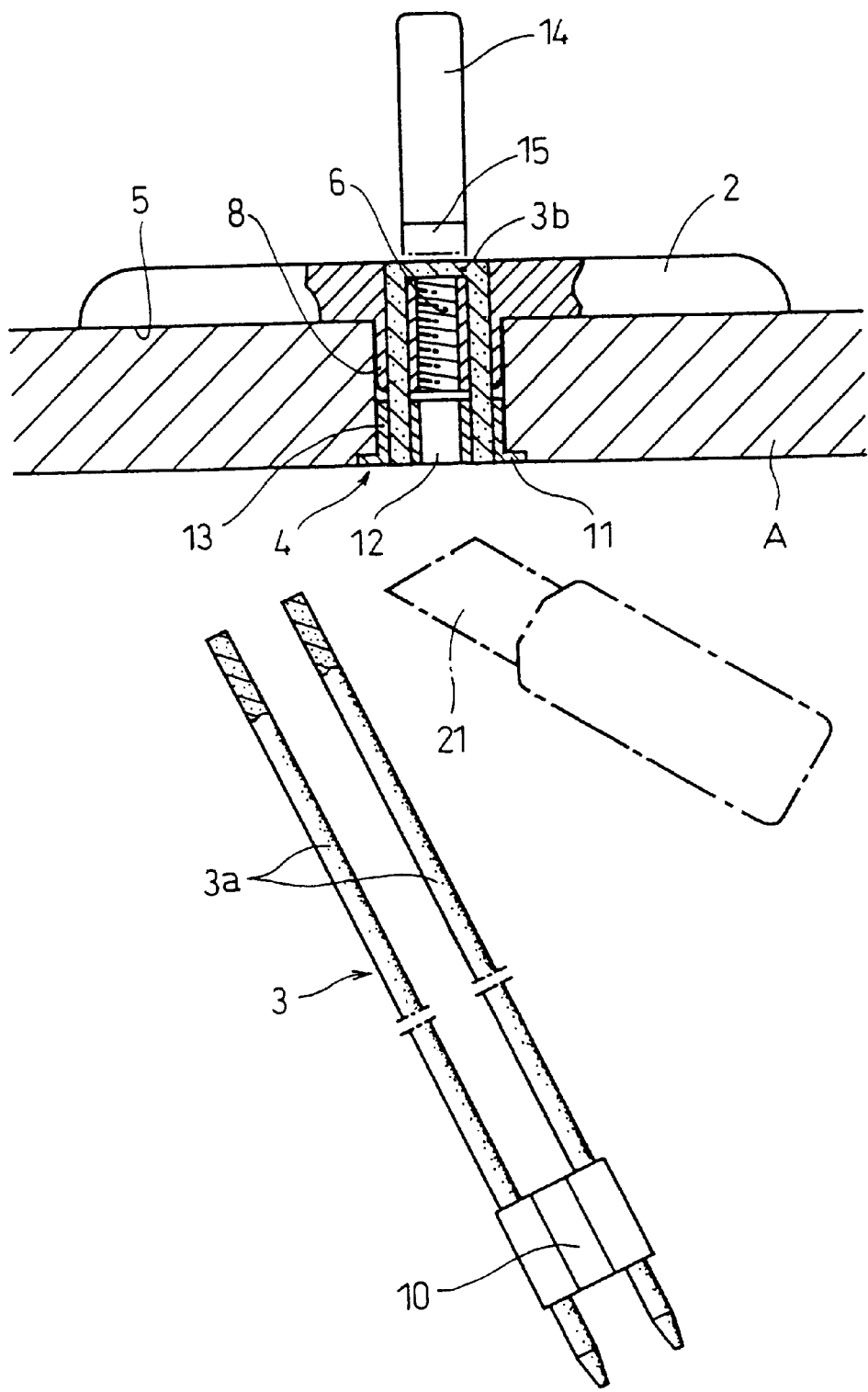
FIG. 6 is a similar view showing how the portions of the legs protruding from the surface of the wall are cut.

With the wall A sandwiched between the plate member 2 and the slide grip member 4, the portions of the legs 3a protruding from the disk portion 11 are cut by e.g. a knife as shown in FIG. 6. Then, as shown in FIG. 7, an object C to be fastened to the wall A is placed on the wall, and a screw D is inserted through the object C and the hole 12 of the slide grip member 4 and threaded into the hole 6 of the plate member 2 to fasten the object C to the wall A.

Figure 7:
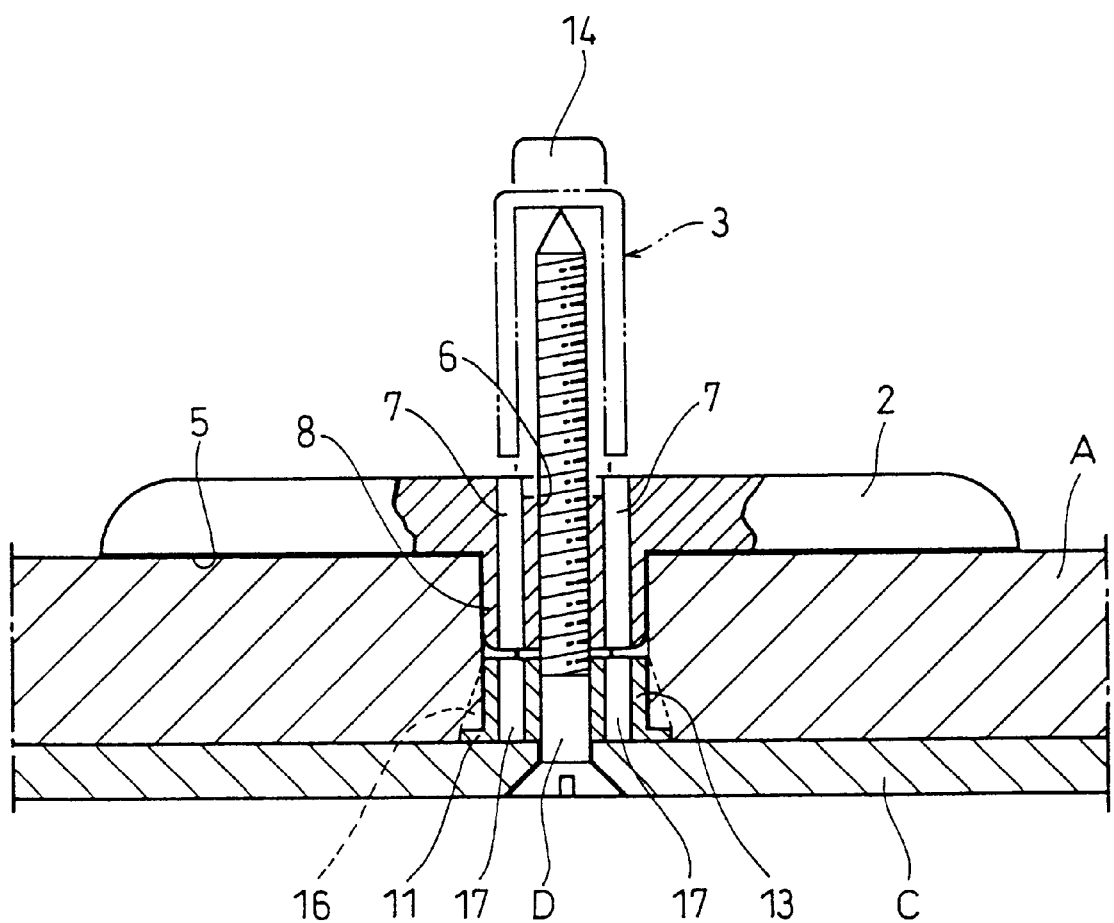
FIG. 7 is a sectional view of the anchor of FIG. 1 when a screw has been tightened with an object fastened to the wall.

The portion of the leg member 3 remaining in the holes 7 and 17 of the plate member 2 and the slide grip member 4 is pushed out by the screw D as shown by two-dot chain line in FIG. 7 and falls into the space behind the wall A.

Although the plate member 2 is pushed in a direction away from the wall by the screw D, the jaws 15 prevent the plate member 2 from moving in this direction and coming off. Since the plate member 2 is prevented by the slide grip member 4 from turning in the hole B, it will never turn together with the screw D.

Thus, simply by threading the screw, the object can be fastened to the wall.

With the arrangement according to the present invention, the following effects are achieved. Firstly the plate member 2 can be inserted into a narrow gap behind the wall which is inaccessible. Secondly the plate member 2 is clamped against the wall by the grip member 4 so as not to turn relative to the grip member. It will not fall off when a screw is tightened through the grip member and the plate member. The arrangement according to the present invention simplifies the work of fastening an article to the wall.

What is claimed is:

1. An anchor used to fasten an object to a wall, said anchor comprising an elongated back support member having a top, two sides and a bottom and formed with a first hole to receive a threaded member, a pair of legs attached to said back support member at both sides of said first hole and protruding from said bottom of said back support member, and a slide grip member comprising a body formed with a hole to receive the threaded member and slidably mounted on said legs, and an opposed pair of arms protruding from said body toward said back support member and adapted to engage said two sides of said back support member when said slide grip member is moved toward said back support member along said legs, said arms being provided on opposed surfaces thereof with jaws protruding toward each other and arranged to engage said back support member when said body is moved toward said back support member along said legs, thereby preventing said slide grip member from coming off said back support member.

2. The anchor as claimed in claim 1 wherein said back support member is an elongated plate member made of a hard material and formed with a flat surface on said bottom, and with a pair of second holes extending from said top to said bottom and spaced from each other in the longitudinal direction of said back support member with said first hole disposed therebetween, and wherein said legs are coupled together by a connecting member and inserted into said respective second holes so as to protrude from said bottom, said body of said slide grip member being formed with a pair of through holes through which said respective legs can pass, said through holes being provided angularly spaced about 90° from said arms.

3. The anchor as claimed in claim 2 wherein said back support member is formed with a boss protruding from said bottom at a longitudinal center thereof, said first and second holes being formed in said boss.

\* \* \* \* \*